United States Patent
Ohk et al.

(10) Patent No.: US 7,342,517 B2
(45) Date of Patent: Mar. 11, 2008

(54) APPARATUS AND METHOD OF BINARY IMAGE COMPRESSION

(75) Inventors: Hyung-soo Ohk, Seoul (KR); Jong-hyon Yi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 18 days.

(21) Appl. No.: 11/496,581

(22) Filed: Aug. 1, 2006

(65) Prior Publication Data

US 2007/0052559 A1    Mar. 8, 2007

(30) Foreign Application Priority Data

Sep. 5, 2005    (KR) .............. 10-2005-0082437

(51) Int. Cl.
    *H03M 7/34*  (2006.01)
(52) U.S. Cl. .......................... 341/51; 341/50
(58) Field of Classification Search ............... 341/51, 341/50; 382/232, 238, 233, 239
    See application file for complete search history.

(56) References Cited

U.S. PATENT DOCUMENTS 6,653,954 B2    11/2003    Rijavec 6,873,737 B2 *    3/2005    Yokose .................. 382/238

FOREIGN PATENT DOCUMENTS

| JP | 07-152533 | 6/1995 |
|---|---|---|
| JP | 2002-354269 | 12/2002 |
| KR | 1996-0035305 | 10/1996 |

* cited by examiner

*Primary Examiner*—Rexford Barnie
*Assistant Examiner*—Joseph Lauture
(74) *Attorney, Agent, or Firm*—Stanzione & Kim, LLP

(57) ABSTRACT

An apparatus to compress a binary image includes a symbol dividing unit to extract at least one symbol from a binary image and to output the extracted symbol and a residue image, a symbol matching encoding unit to perform a symbol matching encoding operation on the extracted symbol, to determine an encoding mode according to a result of the symbol matching operation, and to output symbol matching encoded data and encoding mode information corresponding to the encoding mode, a first encoding unit to perform a bit-based encoding operation on the binary image or the residue image based on the encoding mode information and to output bit-based encoded data, and a bitstream output unit to output the bit-based encoded data of the first encoding unit as a bitstream, or to collect the bit-based encoded data of the first encoding unit and the symbol matching encoded data of the symbol matching unit and to output the collected data as the bitstream, based on the encoding mode information, and a method thereof.

32 Claims, 5 Drawing Sheets

APPARATUS AND METHOD OF BINARY IMAGE COMPRESSION

CROSS-REFERENCE TO RELATED APPLICATIONS

This application claims priority under 35 U.S.C. §119(a) from Korean Patent Application No. 10-2005-0082437, filed on Sep. 5, 2005, in the Korean Intellectual Property Office, the disclosure of which is incorporated herein in its entirety by reference.

BACKGROUND OF THE INVENTION

1. Field of the Invention

The present general inventive concept relates to an apparatus and method of binary image compression, and more particularly, to an apparatus and method of binary image compression in which a compression efficiency according to symbol-based encoding of an input binary image is calculated and a symbol-based encoding operation or a bit-based encoding operation is selectively performed based on the calculated compression efficiency to obtain an efficient binary image compression based on a characteristic of the input binary image.

2. Description of the Related Art

A binary image, such as a gray image, includes components such as a text that can be expressed by a symbol and a picture that cannot be expressed by a symbol. JBIG2 (Joint Bi-level Image Experts Group version 2) prescribed in ITU-T (International Telecommunication Union Telecom) Recommendation T88 compresses components of a binary image that can be expressed by a symbol using a symbol matching-based encoding operation and other components of the binary image that cannot be expressed by a symbol using context-based arithmetic encoding or halftone encoding operations.

Data compressed using different encoding methods is transmitted in units of a segment. In particular, components compressed using a symbol-based encoding operation are expressed by a symbol dictionary segment and a symbol region segment. In the symbol dictionary segment, a bitmap of symbols repetitively used in the binary image is compressed using modified modified read (MMR) encoding or arithmetic encoding operations, and information about each of the symbols (such as a width and a height) is compressed using Huffman encoding or arithmetic encoding operations. In the symbol region segment, a position of each of the symbols included in the binary image and an index of each of the symbols in a symbol dictionary are compressed using Huffman encoding or arithmetic encoding.

The construction of the symbol dictionary segment is as follows. A newly extracted symbol is matched to registered symbols registered in a symbol dictionary. If there is a matching symbol in the symbol dictionary, the newly extracted symbol is encoded using an index of the matching symbol. If the matching symbol does not exist in the symbol dictionary, the newly extracted symbol is added to the symbol dictionary and is encoded using an assigned index thereof.

The newly extracted symbol is sequentially matched to the registered symbols of the symbol dictionary to obtain matching scores to determine whether one of the registered symbols matches the newly extracted symbol. The matching of the newly extracted symbol to the registered symbols may be performed using, for example, a first-match method or a best-match method. The first-match method determines a first registered symbol having a matching score below a threshold value to be a matching symbol (i.e., a registered symbol that matches the newly extracted symbol). The best-match method determines a registered symbol having a best matching score among all of the registered symbols of the symbol dictionary to be a matching symbol (i.e., a registered symbol that matches the newly extracted symbol).

Since symbol-based encoding operations use a redundancy of symbols of a binary image, symbol-based encoding operations include many additional sub-operations, such as symbol extraction and symbol dictionary construction sub-operations, resulting in a high complexity of the compression. However, symbol-based encoding is widely used due to its high compression efficiency resulting from a high redundancy of the symbols in the binary image.

However, in the case of a binary image having a low redundancy of symbols, compression efficiency can be improved using bit-based encoding instead of symbol-based encoding. For example, when a number of extracted symbols extracted from an input binary image is 10 and a number of registered symbols registered in a symbol dictionary is 1, all symbols of the input binary image can be expressed using only a single registered symbol, resulting in a high compression efficiency. On the other hand, if the number of extracted symbols is 10 and the number of registered symbols registered in the symbol dictionary is 10, there is a low similarity between the extracted symbols, indicating that the registered symbols registered in the symbol dictionary are not often referred to, which degrades an efficiency of symbol-based compression.

SUMMARY OF THE INVENTION

The present general inventive concept provides an apparatus and method of binary image compression in which compression efficiency according to symbol-based encoding of an input binary image is calculated, and a symbol-based encoding operation or a bit-based encoding operation is selectively performed based on the calculated compression efficiency to obtain an efficient binary image compression based on a characteristic of the input binary image.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept may be achieved by providing an apparatus to compress a binary image, the apparatus including a symbol dividing unit to extract at least one symbol from the binary image and to output the extracted symbol and a residue image, a symbol matching encoding unit to perform a symbol matching encoding operation on the extracted symbol, to determine an encoding mode according to a result of symbol matching operation, and to output symbol matching encoded data and encoding mode information corresponding to the encoding mode, a first encoding unit to perform a bit-based encoding operation on the binary image or the residue image based on the encoding mode information and to output bit-based encoded data, and a bitstream output unit to output the bit-based encoded data of the first encoding unit as a bitstream, or to collect the bit-based encoded data of the first encoding unit and the symbol matching encoded data of the symbol matching unit and to output the collected data as the bitstream, based on the encoding mode information.

The symbol matching encoding unit may include a symbol dictionary including a bitmap of a plurality of symbols registered in the symbol directory and a bitmap of the extracted symbol when the extracted symbol is registered in the symbol directory based on a result of a matching operation performed between the extracted symbol and the plurality of symbols, a symbol matching unit to perform the matching operation between the extracted symbol and the plurality of symbols to determine an index of the extracted symbol and to determine the encoding mode, and a second encoding unit to generate the symbol matching encoded data by encoding the bitmap of the plurality of symbols, the bitmap of the extracted symbol when the extracted symbol is registered in the symbol directory, and the index and position information of the extracted symbol.

The symbol matching encoding unit may further include a pre-processor to smooth edges of the extracted symbol to improve an accuracy of the matching operation.

The symbol matching unit may include a matching index determining unit to sequentially perform matching operations between the extracted symbol and each of the plurality of symbols registered in the symbol dictionary to calculate matching scores, and to determine the index of the extracted symbol based on the calculated matching scores, and an encoding mode determining unit to calculate an encoding rate using a frequency of a use of the plurality of symbols registered in the symbol dictionary, and to compare the calculated encoding rate with a predetermined threshold value to determine the encoding mode.

The first encoding unit may include a first selecting unit to select the binary image or the residue image based on the encoding mode information and to output the selected image, and a bit-based encoding unit to perform the bit-based encoding operation on the selected image.

The bitstream output unit may include a data collecting unit to collect the bit-based encoded data of the symbol matching encoding unit and the symbol matching encoded data of the first encoding unit and to output the collected data, and a second data selecting unit to select the collected data or the bit-based encoded data of the first encoding unit based on the encoding mode information and to output selected data as the bitstream.

The foregoing and/or other aspects and utilities of the present general inventive concept may also be achieved by providing a method of binary image compression, the method including extracting at least one symbol from a binary image and outputting the extracted symbol and a residue image, performing a symbol matching encoding operation on the extracted symbol, determining an encoding mode according to a result of symbol matching operation, and outputting symbol matching encoded data and encoding mode information corresponding to the encoding mode, performing a bit-based encoding operation on the binary image or the residue image based on the encoding mode information and outputting bit-based encoded data, and outputting the bit-based encoded data as a bitstream or collecting the bit-based encoded data and the symbol matching encoded data and outputting the collected data as the bitstream, according to the encoding mode information.

The performing of the symbol matching encoding operation may include performing a matching operation between the extracted symbol and a plurality of symbols registered in a symbol dictionary including a bitmap of the plurality of registered symbols, determining an index of the extracted symbol based on a result of the matching operation, calculating an encoding rate using the result of the matching operation and determining the encoding mode based on the calculated encoding rate, and encoding the bitmap of the plurality of registered symbols, a bitmap of the extracted symbol, and the index and position information of the extracted symbol to generate the symbol matching encoded data.

The determining of the index of the extracted symbol may include sequentially performing matching operations between the extracted symbol and the plurality of symbols registered in the symbol dictionary to calculate matching scores, and determining whether the extracted symbol is included in the symbol dictionary based on the calculated matching scores, registering the extracted symbol in the symbol dictionary and assigning a new index to be an index of the extracted symbol when it is determined that the extracted symbol is not included in the symbol dictionary, and determining a prior index registered in the symbol dictionary to be the index of the extracted symbol when it is determined that the extracted symbol is included in the symbol dictionary.

The performing of the bit-based encoding operation may include determining whether the encoding mode is a symbol-based encoding mode or a bit-based encoding mode based on the encoding mode information, performing a bit-based encoding operation on the residue image when the encoding mode is determined to be the symbol-based encoding mode in, and performing a bit-based encoding operation on the binary image when the encoding mode is determined to be the bit-based encoding mode in.

The performing of the symbol matching encoding operation may further include smoothing edges of the extracted symbol to improve an accuracy of the matching operation.

The calculating of the encoding rate may include calculating the encoding rate using a frequency of a use of the plurality of symbols registered in the symbol dictionary, and comparing the calculated encoding rate with a predetermined threshold value to determine the encoding mode.

The outputting of the bit-based encoded data or the collected data as the bitstream may include determining whether the encoding mode is a symbol-based encoding mode or a bit-based encoding mode based on the encoding mode information, collecting the symbol matching encoded data and the bit-based encoded data and determining the collected data to be the binary image compression data when the encoding mode is determined to be the symbol-based encoding mode, and determining the bit-based encoded data to be the binary image compression data if the encoding mode is determined to be the bit-based encoding mode.

The binary image may include a plurality of binary images, and an encoding mode may be determined for each binary image of the plurality of binary images. The binary image may include a plurality of binary images, and a first encoding mode may be determined for a first portion of the plurality of binary images, and a second encoding mode may be determined for at least one binary image of a second portion of the plurality of binary images. The at least one extracted symbol may include a plurality of extracted symbols, the symbol matching encoding operation may be performed on a portion of the plurality of extracted symbols, and the encoding mode may be determined based on the a result of the symbol matching encoding operation performed on the portion of the plurality of extracted symbols.

The foregoing and/or other aspects and utilities of the present general inventive concept may also be achieved by providing a computer-readable recording medium having recorded thereon a program to implement a method of binary image compression, the method including extracting at least one symbol from a binary image and outputting the extracted symbol and a residue image, performing a symbol matching encoding operation on the extracted symbol, determining an encoding mode according to a result of symbol matching operation, and outputting symbol matching encoded data and encoding mode information corresponding to the encoding mode, performing a bit-based encoding operation on the binary image or the residue image based on the encoding mode information and outputting bit-based encoded data, and outputting the bit-based encoded data as a bitstream or collecting the bit-based encoded data and the symbol matching encoded data and outputting the collected data as the bitstream, according to the encoding mode information.

The foregoing and/or other aspects and utilities of the present general inventive concept may also be achieved by providing a device to compress a binary image including at least one extracted symbol and a residue image, the device including a symbol matching encoded data generating unit to generate symbol matching encoded data corresponding to the at least one extracted symbol of the binary image, and to generate encoding mode information corresponding to an encoding mode based on a comparison between the at least one extracted symbol and a plurality of registered symbols registered in a symbol dictionary, a bit-based encoded data generating unit to generate bit-based encoded data corresponding to one of the binary image and the residue image based on the encoding mode information, and a bitstream outputting unit to output a bitstream corresponding to the bit-based encoded data or a collection of the symbol matching encoded data and the bit-based encoded data based on the encoding mode information.

The device may further include a dividing unit to generate the at least one extracted symbol by extracting at least one symbol from the binary image, and to divide the binary image into the at least one extracted symbol and the residue image. The dividing unit may generate a bitmap of the at least one extracted symbol. The dividing unit may extract the at least one symbol from the binary image using a pattern recognizing algorithm.

The symbol matching encoded data generating unit may include a symbol comparing unit to determine an index of the at least one extracted symbol based on a comparison between the at least one extracted symbol and the plurality of registered symbols, and to generate the encoding mode information based on the comparison, and a symbol encoding unit to generate the symbol matching encoded data using the index of the at least one extracted symbol, a bitmap of the plurality of registered symbols, and position information of the at least one extracted symbol in the binary image.

The symbol comparing unit may include an index determining unit to determine that the index of the at least one extracted symbol is an index of a registered symbol of the plurality of registered symbols when the comparison indicates that the registered symbol matches the at least one extracted symbol, and to assign a new index to the at least one extracted symbol when the comparison indicates that the plurality of registered symbols does not include the registered symbol that matches the at least one extracted symbol.

The symbol comparing unit may include an encoding mode information generating unit to calculate an encoding rate corresponding to a frequency that the plurality of registered symbols are used in the binary image based on the comparison result, to analyze a relationship between the calculated encoding rate and a predetermined threshold, and to generate the encoding mode information based on the analysis result.

The encoding mode information generating unit may generate bit-based encoding mode information when the calculated encoding rate is greater than or equal to the predetermined threshold, and may generate symbol matching encoding mode information when the calculated encoding rate is less than the predetermined threshold.

The bit-based encoded data generating unit may include an image selecting unit to select the residue image when the encoding mode information is symbol-based encoding information, and to select the binary image when the encoding mode information is bit-based encoding information, and a bit-based encoding unit to generate the bit-based encoded data corresponding to the selected image. The bitstream may correspond to the bit-based encoded data when the encoding mode information is bit-based encoding mode information, and may corresponds to the collection of the symbol matching encoded data and the bit-based encoded data when the encoding information is symbol-based encoding mode information.

The foregoing and/or other aspects and utilities of the present general inventive concept may also be achieved by providing a method of compressing a binary image including at least one extracted symbol and a residue image, the method including generating symbol matching encoded data corresponding to the at least one extracted symbol of the binary image, and encoding mode information corresponding to an encoding mode based on a comparison between the at least one extracted symbol and a plurality of registered symbols registered in a symbol dictionary, generating bit-based encoded data corresponding to one of the binary image and the residue image based on the encoding mode information, and outputting a bitstream corresponding to the bit-based encoded data or a collection of the symbol matching encoded data and the bit-based encoded data based on the encoding mode information.

The generating of the symbol matching encoded data and the encoded mode information may include determining an index of the at least one extracted symbol based on a comparison between the at least one extracted symbol and the plurality of registered symbols, generating the symbol matching encoded data using the index of the at least one extracted symbol, a bitmap of the plurality of registered symbols, and position information of the at least one extracted symbol in the binary image, and generating the encoding mode information based on the comparison result.

The determining of the index may include determining that the index of the at least one extracted symbol is an index of a registered symbol of the plurality of registered symbols when the comparison indicates that the registered symbol matches the at least one extracted symbol, and assigning a new index to the at least one extracted symbol when the comparison indicates that the plurality of registered symbols does not include the registered symbol that matches the at least one extracted symbol.

The generating of the encoding mode information may further include calculating an encoding rate corresponding to a frequency that the plurality of registered symbols are used in the binary image based on the comparison result, analyzing a relationship between the calculated encoding rate and a predetermined threshold, and generating the encoding mode information based on the analysis result. The generating of the encoding mode information may further include generating bit-based encoding mode information when the calculated encoding rate is greater than or equal to the predetermined threshold, and generating symbol matching encoding mode information when the calculated encoding rate is less than the predetermined threshold.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
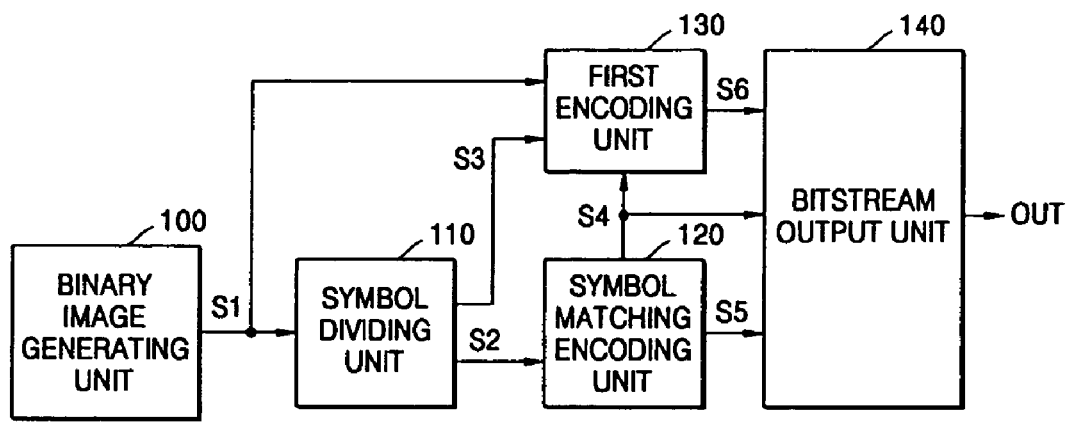
FIG. 1 is a block diagram illustrating an apparatus to compress a binary image, according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram of an apparatus to compress a binary image, according to an embodiment of the present general inventive concept. The apparatus includes a binary image generating unit 100, a symbol dividing unit 110, a symbol matching encoding unit 120, a first encoding unit 130, and a bitstream output unit 140.

Referring to FIG. 1, the binary image generating unit 100 generates a binary image S1 to be compressed according to the present embodiment and provides the generated binary image S1 to the symbol dividing unit 110. The binary image generating unit 100 may be, for example, a scanner or an image photographing device.

The symbol dividing unit 110 extracts at least one symbol from the binary image S1 provided from the binary image generating unit 100 and divides the binary image into an extracted symbol S2 and a residue image S3. More specifically, the symbol dividing unit 110 extracts the at least one symbol and generates a bitmap of the extracted at least one symbol. The symbol dividing unit 110 may extract a symbol based on, for example, various pattern recognizing algorithms, among which a pattern recognizing algorithm using connected components of the binary image is representative. However, the symbol dividing unit 110 is not required to base the extraction on a pattern recognizing algorithm using connected components of the binary image.

The symbol matching encoding unit 120 performs a symbol matching encoding operation on the extracted symbol S2, calculates an encoding rate based on a result of the symbol matching encoding operation to determine an encoding mode, and outputs encoding mode information S4 (corresponding to the encoding mode) and symbol matching encoded data S5.

The first encoding unit 130 performs bit-based encoding on the binary image S1 or the residue image S3 based on the encoding mode information S4 and outputs bit-based encoded data S6.

According to the encoding mode information S4, the bitstream output unit 140 either outputs the bit-based encoded data S6 output from the first encoding unit 130 as a bitstream OUT, or collects the bit-based encoded data S6 output from the first encoding unit 130 and the symbol matching encoded data S5 output from the symbol matching encoding unit 120 and outputs the collected data as the bitstream OUT.

Figure 2:
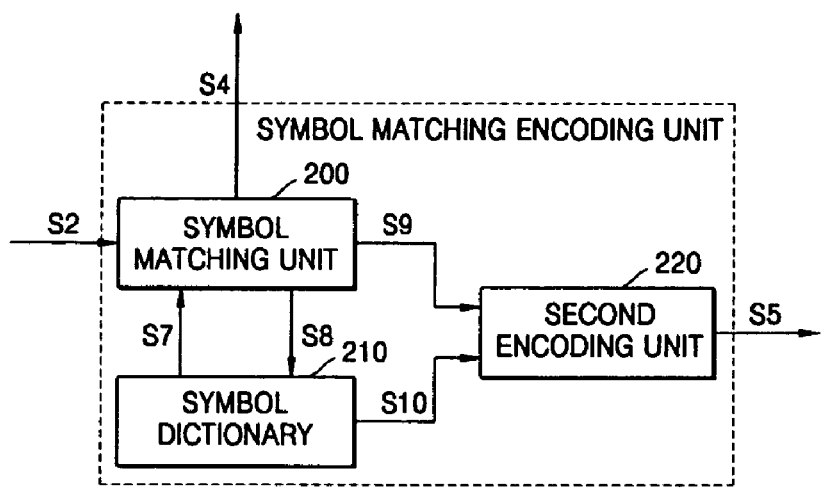
FIG. 2 is a detailed block diagram illustrating a symbol matching encoding unit of the apparatus of FIG. 1, according to an embodiment of the present general inventive concept.

FIG. 2 is a detailed block diagram of the symbol matching encoding unit 120 of the apparatus of FIG. 1, according to an embodiment of the present general inventive concept. The symbol matching encoding unit 120 may include a symbol matching unit 200, a symbol dictionary 210, and a second encoding unit 220.

A bitmap of a plurality of symbols may be previously registered in the symbol dictionary 210. A bitmap S8 of the extracted symbol S2 extracted by the symbol dividing unit 120 may be additionally registered in the symbol dictionary 210, according to a matching result of the symbol matching unit 200 (described below). In other words, if a symbol matched to the extracted symbol S2 is not included in the symbol dictionary 210 (determined by the symbol matching of the symbol matching unit 200), the extracted symbol S2 is registered in the symbol dictionary 210. On the other hand, if the symbol matched to the extracted symbol S2 is included in the symbol dictionary 210 (determined by the symbol matching of the symbol matching unit 200), the matched symbol is used and the extracted symbol S2 is not registered in the symbol dictionary 210.

The symbol matching unit 200 performs a matching operation between the extracted symbol S2 and symbols S7 registered in the symbol dictionary 210 to determine an index S9 of the extracted symbol S2. The symbol matching unit 200 also determines an encoding mode and outputs the encoding mode information S4 (corresponding to the encoding mode). Here, the symbols S7 registered in the symbol dictionary 210 encompass previously registered representative symbols and/or additionally registered representative symbols registered through a prior symbol matching operation.

The second encoding unit 220 encodes a bitmap S10 of the symbols S7, the determined index S9 of the extracted symbol S2, and position information of each symbol of the binary image to generate the symbol matching encoded data S5. Here, the second encoding unit 220 may perform, but is not limited to performing, MMR, JBIG, arithmetic encoding, and/or Huffman encoding operations.

Figure 8:
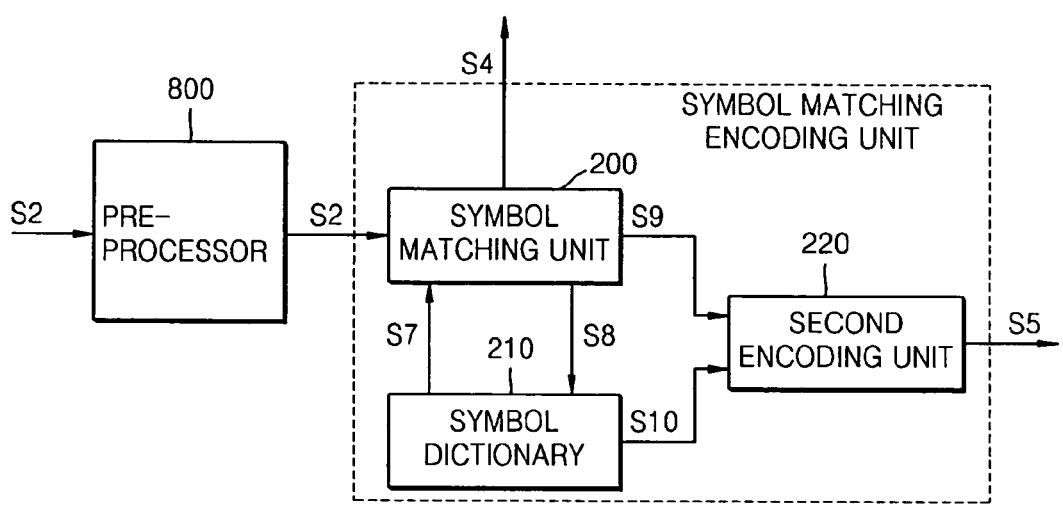
FIG. 8 is a detailed block diagram illustrating the symbol matching encoding unit of the apparatus of FIG. 1 and a pre-processor, according to an embodiment of the present general inventive concept

Through a pre-processing operation, such as smoothing of edges of the extracted symbol S2, at a pre-processor 800 (see FIG. 8) upstream of the symbol matching unit 200, an accuracy of the matching operation performed by the symbol matching encoding unit 120 can be improved.

Figure 3:
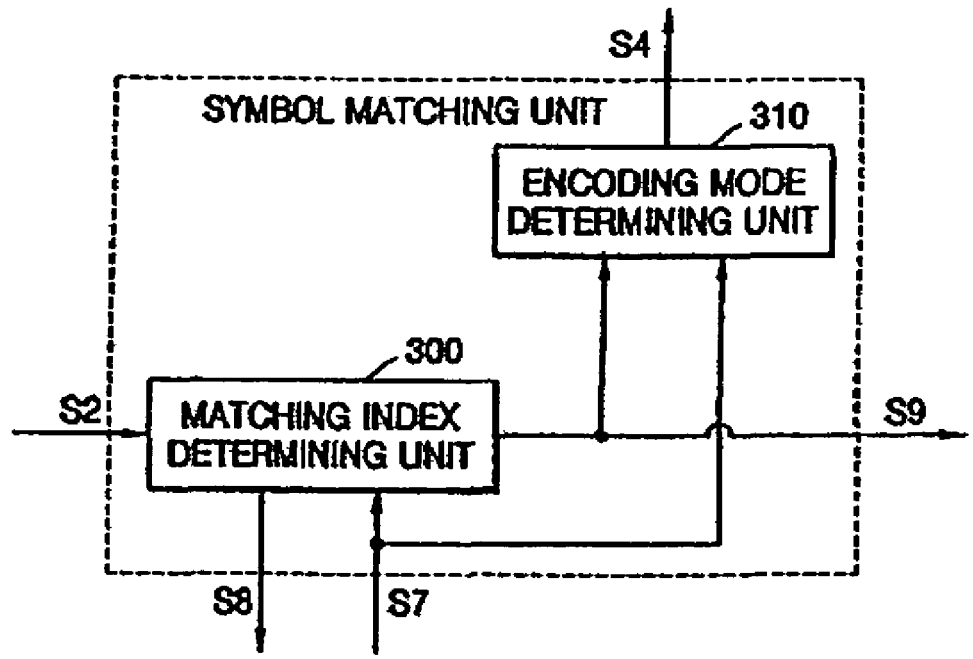
FIG. 3 is a detailed block diagram illustrating a symbol matching unit of the symbol matching encoding unit of FIG. 2, according to an embodiment of the present general inventive concept.

FIG. 3 is a detailed block diagram of the symbol matching unit 200 of the symbol matching encoding unit 120 of FIG. 2, according to an embodiment of the present general inventive concept. The symbol matching unit 200 may include a matching index determining unit 300 and an encoding mode determining unit 310.

The matching index determining unit 300 sequentially performs matching operations between the extracted symbol S2 and each of the symbols S7 registered in the symbol dictionary 210 to calculate matching scores, and determines the index S9 of the extracted symbol S2 based on the calculated matching scores. In other words, as mentioned above, the matching index determining unit 300 performs matching operations, such as the first-match matching method or the best-match matching method, using the extracted symbol S2.

If a symbol registered in the symbol dictionary 210 is matched to the extracted symbol S2, then the matching index determining unit 300 provides the index S9 of the matched symbol as the index S9 of the extracted symbol S2 to the second encoding unit 220. On the other hand, if there is no symbol registered in the symbol dictionary 210 matched to the extracted symbol S2, then the matching index determining unit 300 registers the extracted symbol S2 in the symbol dictionary 210, assigns a new index as the index S9 of the extracted symbol S2, and provides the newly-assigned index (i.e., assigned to the extracted symbol S2 during the registration of the extracted symbol S2 in the symbol dictionary 210) as the index S9 of the extracted symbol S2 to the second encoding unit 220.

Here, the matching score calculation may be performed by sequentially performing matching operations between the bitmap S8 of the extracted symbol S2 and the bitmap S10 of the symbols S7 registered in the symbol dictionary 120 and calculating matching scores, such as similarity scores. Matching scores may be calculated, for example, by performing an exclusive OR (XOR) operation or a weighted XOR operation on the bitmaps S8 and S10, or using a computer science and information system (CSIS) program, or other pattern matching algorithms.

The encoding mode determining unit 310 calculates an encoding rate using a frequency of a use of the symbols S7 registered in the symbol dictionary 210, compares the calculated encoding rate with a predetermined threshold value to determine the encoding mode, and outputs the encoding mode information S4 (corresponding to the determined encoding mode).

For example, when a number of representative symbols a1, a2, a3, and a4 registered in the symbol dictionary 210 is 4, a number of additionally registered symbols (i.e., symbols extracted from the binary image that were not matched to symbols previously-registered in the symbol dictionary 210 and thus were registered therein by the encoding mode determining unit 310) a5 and a6 is 2, a number of extracted symbols is 8, and the extracted symbols are matched to a1, a1, a2, a2, a3, a4, a5, and a6, respectively, the encoding rate can be calculated as follows. The encoding rate may be calculated using a ratio of the number of symbols S7 registered in the symbol dictionary 210 and the number of extracted symbols. Thus, in this example, the encoding rate is 6/8. The encoding rate may also be calculated by averaging the frequency of the use of each of the symbols S7 registered in the symbol dictionary 210. Thus, in this example, the encoding rate is $[(1/2)+(1/2)+(1/1)+(1/1)+(1/1)+(1/1)]/6$. However, the encoding mode can be determined using various methods in addition to the two methods described above.

The calculated encoding rate and the predetermined threshold value are compared, and the encoding mode is determined based on the comparison. For example, if the calculated encoding rate and the predetermined threshold value are compared and the calculated encoding rate is greater than the predetermined threshold value, it may be determined that a symbol matching encoding operation is inefficient in terms of a characteristic of the input binary image, and thus a bit-based encoding mode may be set as the encoding mode. On the other hand, if the calculated encoding rate is less than the predetermined threshold value, a symbol matching encoding mode may be set as the encoding mode.

When a plurality of binary images is input, an encoding mode may be determined for each of the binary images of the plurality of binary images. However, when the binary images of the plurality of binary images are similar to each other, an encoding mode determined for one of the binary images may be applied to the remaining binary images. Even when a single binary image is input, the symbol matching operation is not required to be performed on all symbols extracted from the input binary image, and thus the symbol matching operation may be performed on only some of the extracted symbols to determine the encoding mode.

Figure 4:
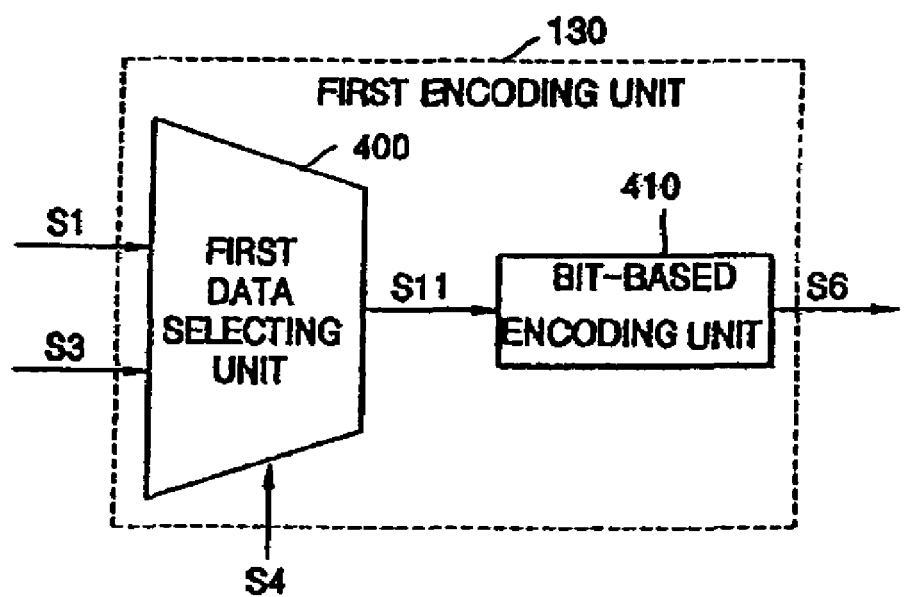
FIG. 4 is a detailed block diagram illustrating a first encoding unit of the apparatus of FIG. 1, according to an embodiment of the present general inventive concept.

FIG. 4 is a detailed block diagram of the first encoding unit 130 of the apparatus of FIG. 1, according to an embodiment of the present general inventive concept. The first encoding unit 130 may include a first data selecting unit 400 and a bit-based encoding unit 410.

The first data selecting unit 400 selects the binary image S1 or the residue image S3 based on the encoding mode information S4 and outputs a selected image S11.

The bit-based encoding unit 410 performs bit-based encoding on the selected image S11. Bit-based encoding may be, but is not limited to arithmetic encoding or MMR encoding operations.

In other words, if the encoding mode information S4 includes symbol-based encoding information, the residue image S3 is selected and encoded. On the other hand, if the encoding mode information S4 includes bit-based encoding information, the binary image S1 is selected and encoded.

Figure 5:
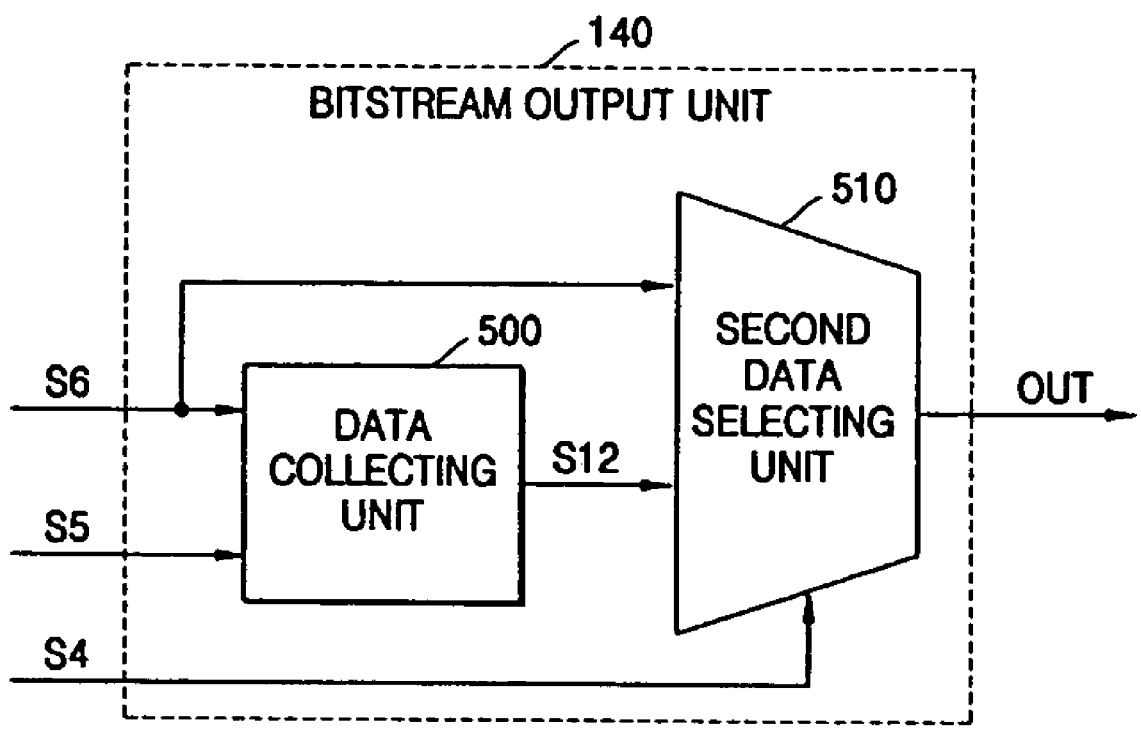
FIG. 5 is a detailed block diagram illustrating a bitstream output unit of the apparatus of FIG. 1, according to an embodiment of the present general inventive concept.

FIG. 5 is a detailed block diagram of the bitstream output unit 140 of the apparatus of FIG. 1, according to an embodiment of the present general inventive concept. The bitstream output unit 140 may include a data collecting unit 500 and a second data selecting unit 510.

The data collecting unit 500 collects the symbol matching encoded data S5 output from the symbol matching encoding unit 120 and the bit-based encoded data S6 output from the first encoding unit 130 and outputs collected data S12 to the second data selecting unit 510.

The second data selecting unit 510 selects the collected data S12 or the bit-based encoded data S6 output from the first encoding unit 130 based on the encoding mode information S4 and outputs the selected data as the bitstream OUT.

In other words, if the encoding mode information S4 includes symbol-based encoding mode information, then the output of the symbol matching encoding unit 120 (i.e., the symbol matching encoded data S5) and the output of the first encoding unit 130 (i.e., the bit-based encoded data S6) are collected and output as the bitstream OUT On the other hand, if the encoding mode information S4 includes bit-based encoding mode information, the output of the first encoding unit 130 (i.e., the bit-based encoded data S6) is output as the bitstream OUT.

Figure 6:
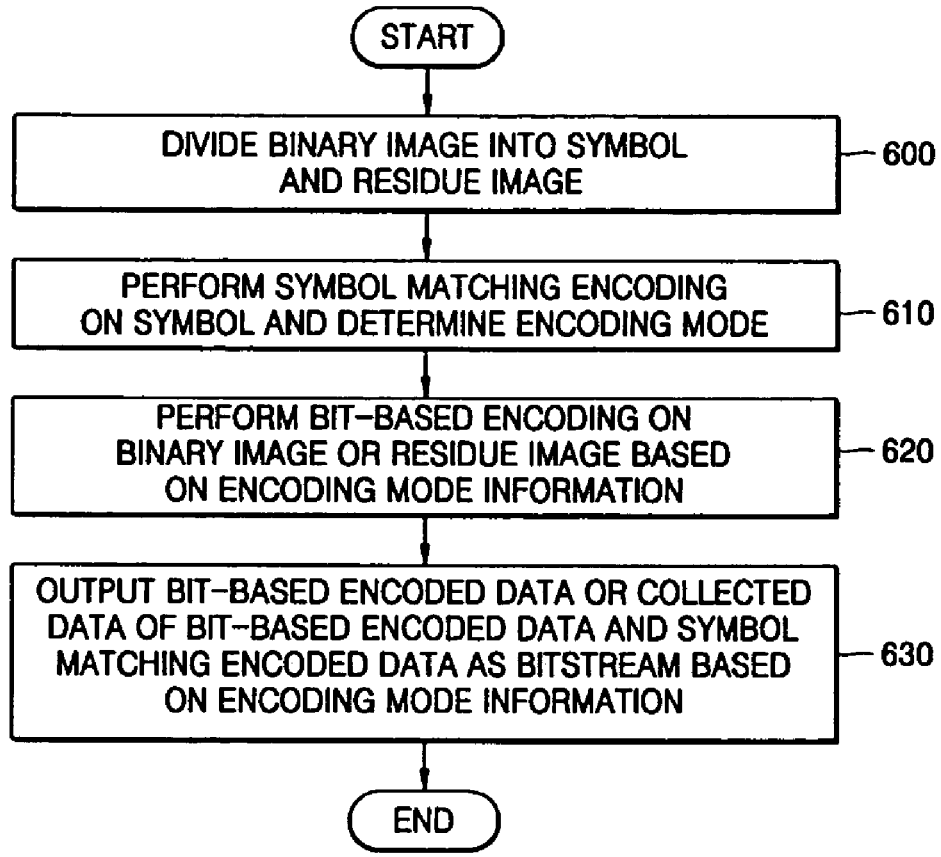
FIG. 6 is a flowchart illustrating a method of binary image compression, according to an embodiment of the present general inventive concept.

FIG. 6 is a flowchart illustrating a method of binary image compression, according to an embodiment of the present general inventive concept.

Referring to FIGS. 1 and 6, at least one symbol is extracted by the symbol dividing unit 110 from the binary image S1 generated by the binary image generating unit 100, and thus the binary image S1 is divided into the extracted symbol S2 and the residue image S3 in operation 600.

A symbol matching encoding operation is performed on the extracted symbol S2 by the symbol matching encoding unit 120, and an encoding rate is calculated to determine the encoding mode information S4 in operation 610. Here, to improve the accuracy of the matching operation, a pre-processing operation of smoothing edges of the extracted symbol S2, performed by the pre-processor 800 (see FIG. 8), may be further included after operation 600.

A bit-based encoding operation is performed on the binary image S1 or the residue image S3 by the first encoding unit 130, based on the encoding mode information S4, in operation 620. A detailed operation thereof is as follows. It is determined whether an encoding mode is a symbol matching encoding mode or a bit-based encoding mode based on the encoding mode information S4. If an encoding mode is determined to be the symbol matching encoding mode, bit-based encoding is performed on the residue image S3. If the encoding mode is determined to be the bit-based encoding mode, bit-based encoding is performed on the binary image S1.

Referring to FIGS. 5 and 6, the bit-based encoded data S6 output from the first encoding unit 130 or the collected data S12 (including the bit-based encoded data S6 and the symbol matching encoded data S5) is determined to be binary image compression data according to the encoding mode information S4 in operation 630. The data determined to the binary image compression data is output as the bitstream OUT. A detailed operation of operation 630 is as follows. It is determined whether the encoding mode is the symbol-based encoding mode or the bit-based encoding mode. If the encoding mode is determined to be the symbol-based encoding mode, the bit-based encoded data S6 and the symbol matching encoded data S5 are collected as the collected data S12, and the collected data S12 is determined to be the binary image compression data. If the encoding mode is determined to be the bit-based encoding mode, the bit-based encoded data S6 is determined to be the binary image compression data.

Figure 7:
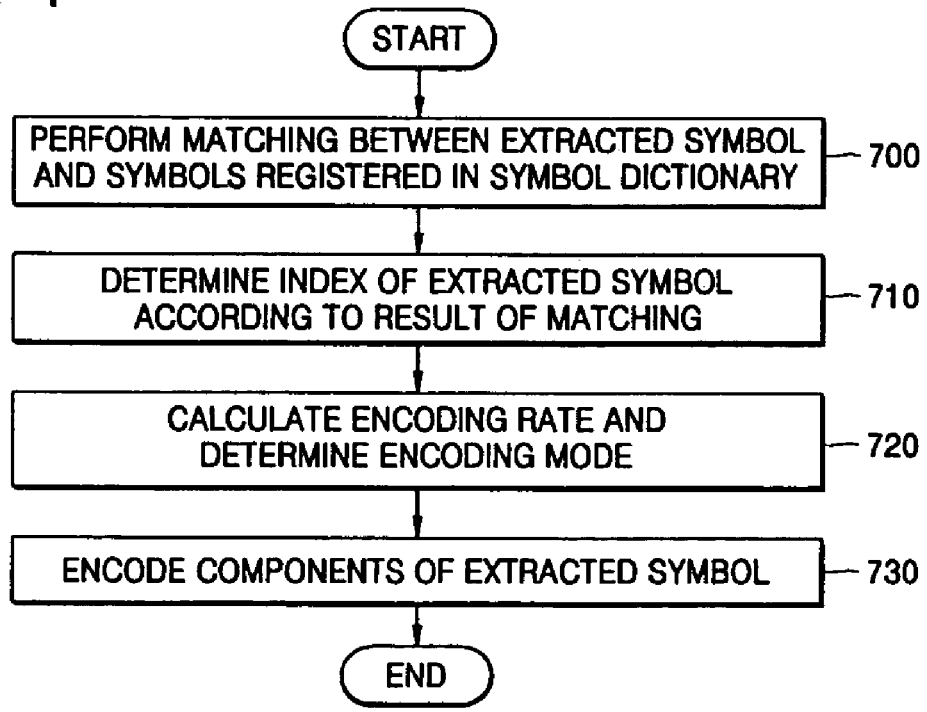
FIG. 7 is a detailed flowchart illustrating operation 610 of the method of FIG. 6, according to an embodiment of the present general inventive concept.

FIG. 7 is a detailed flowchart illustrating operation 610 of the method of FIG. 6, according to an embodiment of the present general inventive concept.

Referring to FIGS. 1, 2, and 6, the extracted symbol S2 extracted by the symbol matching unit 200 is matched with the symbols S7 registered in the symbol dictionary 210 in operation 700. Here, the symbols S7 registered in the symbol dictionary 210 indicate representative symbols previously registered or additionally registered in the symbol dictionary 210.

Referring to FIGS. 1, 3, and 6, in operation 710, the index 59 of the extracted symbol S2 is determined by the matching index determining unit 300 according to a result of the matching operation. A detailed operation thereof is as follows. It is determined whether a symbol matched to the extracted symbol S2 is included in the symbol dictionary 210 based on the result of the matching. If it is determined that there is no symbol matched to the extracted symbol S2 in the symbol dictionary 210, the extracted symbol S2 and the index S9 thereof are registered in the symbol dictionary 210. If it is determined that there is a symbol matched to the extracted symbol S2 in the symbol dictionary 210, an index of that matched symbol registered in the symbol dictionary 210 is determined to be the index 59 of the extracted symbol S2.

Referring to FIGS. 1-3 and 6, an encoding rate is calculated by the encoding mode determining unit 310 using the result of the index determination, and the encoding mode is determined based on the calculated encoding rate in operation 720. The determined encoding mode is provided to the first encoding unit 130 and the bitstream output unit 140 as the encoding mode information S4. In other words, the encoding rate is calculated using a frequency of a use of the symbols S7 (registered in the symbol dictionary 210) in the input binary image, and the calculated encoding rate and a predetermined threshold value are compared to determine the encoding mode.

The bitmap S10 of the symbols S7 registered in the symbol dictionary 210, the determined index S9 of the extracted symbol, and position information of each symbol are encoded by the second encoding unit 220 in operation 730.

As described above, according to the present general inventive concept, compression efficiency according to a symbol-based encoding of an input binary image is calculated and a symbol-based encoding operation or a bit-based encoding operation is selectively performed based on the calculated compression efficiency to obtain an efficient binary image compression based on a characteristic of the input binary image.

Meanwhile, the present general inventive concept can also be embodied as a computer-readable code on a computer-readable recording medium. The computer-readable recording may include any data storage device that can store data which can be thereafter read by a computer system. Examples of the computer-readable recording medium include, but are not limited to, read-only memory (ROM), random-access memory (RAM), CD-ROMs, magnetic tapes, floppy disks, optical data storage devices, and carrier waves (such as data transmission through the Internet). The computer-readable recording medium can also be distributed over network coupled computer systems so that the computer-readable code is stored and executed in a distributed fashion. Functional program, code and code segments for implementing the present general inventive concept can be easily construed by programmers in the field of the present general inventive concept. Various embodiments of the present general inventive concept may also be embodied in hardware or in a combination of hardware and software.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An apparatus to compress a binary image, the apparatus comprising:
   a symbol dividing unit to extract at least one symbol from the binary image and to output the extracted symbol and a residue image;
   a symbol matching encoding unit to perform a symbol matching encoding operation on the extracted symbol, to determine an encoding mode according to a result of symbol matching operation, and to output symbol matching encoded data and encoding mode information corresponding to the encoding mode;

a first encoding unit to perform a bit-based encoding operation on the binary image or the residue image based on the encoding mode information and to output bit-based encoded data; and a bitstream output unit to output the bit-based encoded data of the first encoding unit as a bitstream, or to collect the bit-based encoded data of the first encoding unit and the symbol matching encoded data of the symbol matching unit and to output the collected data as the bitstream, based on the encoding mode information.

2. The apparatus of claim 1, wherein the symbol matching encoding unit comprises:

a symbol dictionary including a bitmap of a plurality of symbols registered in the symbol directory and a bitmap of the extracted symbol when the extracted symbol is registered in the symbol directory based on a result of a matching operation performed between the extracted symbol and the plurality of symbols;

a symbol matching unit to perform the matching operation between the extracted symbol and the plurality of symbols to determine an index of the extracted symbol, and to determine the encoding mode; and a second encoding unit to generate the symbol matching encoded data by encoding the bitmap of the plurality of symbols, the bitmap of the extracted symbol when the extracted symbol is registered in the symbol directory, and the index and position information of the extracted symbol.

3. The apparatus of claim 2, wherein the symbol matching encoding unit further comprises:

a pre-processor to smooth edges of the extracted symbol to improve an accuracy of the matching operation.

4. The apparatus of claim 2, wherein the symbol matching unit comprises:

a matching index determining unit to sequentially perform matching operations between the extracted symbol and each of the plurality of symbols registered in the symbol dictionary to calculate matching scores, and to determine the index of the extracted symbol based on the calculated matching scores; and an encoding mode determining unit to calculate an encoding rate using a frequency of a use of the plurality of symbols registered in the symbol dictionary, and to compare the calculated encoding rate with a predetermined threshold value to determine the encoding mode.

5. The apparatus of claim 1, wherein the first encoding unit comprises:

a first selecting unit to select the binary image or the residue image based on the encoding mode information and to output the selected image; and a bit-based encoding unit to perform the bit-based encoding operation on the selected image.

6. The apparatus of claim 1, wherein the bitstream output unit comprises:

a data collecting unit to collect the bit-based encoded data of the symbol matching encoding unit and the symbol matching encoded data of the first encoding unit and to output the collected data; and a second data selecting unit to select the collected data or the bit-based encoded data of the first encoding unit based on the encoding mode information and to output selected data as the bitstream.

7. A method of binary image compression, the method comprising:

extracting at least one symbol from a binary image and outputting the extracted symbol and a residue image;

performing a symbol matching encoding operation on the extracted symbol, determining an encoding mode based on a result of symbol matching operation, and outputting symbol matching encoded data and encoding mode information corresponding to the encoding mode;

performing a bit-based encoding operation on the binary image or the residue image based on the encoding mode information and outputting bit-based encoded data; and outputting the bit-based encoded data as a bitstream or collecting the bit-based encoded data and the symbol matching encoded data and outputting the collected data as the bitstream, according to the encoding mode information.

8. The method of claim 7, wherein the performing of the symbol matching encoding operation comprises:

performing a matching operation between the extracted symbol and a plurality of symbols registered in a symbol dictionary including a bitmap of the plurality of registered symbols;

determining an index of the extracted symbol based on a result of the matching operation;

calculating an encoding rate using the result of the matching operation and determining the encoding mode based on the calculated encoding rate; and encoding the bitmap of the plurality of registered symbols, a bitmap of the extracted symbol, and the index and position information of the extracted symbol to generate the symbol matching encoded data.

9. The method of claim 8, wherein the determining of the index of the extracted symbol comprises:

sequentially performing matching operations between the extracted symbol and the plurality of symbols registered in the symbol dictionary to calculate matching scores, and determining whether the extracted symbol is included in the symbol dictionary based on the calculated matching scores;

registering the extracted symbol in the symbol dictionary and assigning a new index to be an index of the extracted symbol when it is determined that the extracted symbol is not included in the symbol dictionary; and determining a prior index registered in the symbol dictionary to be the index of the extracted symbol when it is determined that the extracted symbol is included in the symbol dictionary.

10. The method of claim 7, wherein the performing of the bit-based encoding operation comprises:

determining whether the encoding mode is a symbol-based encoding mode or a bit-based encoding mode based on the encoding mode information;

performing a bit-based encoding operation on the residue image when the encoding mode is determined to be the symbol-based encoding mode in; and performing a bit-based encoding operation on the binary image when the encoding mode is determined to be the bit-based encoding mode in.

11. The method of claim 8, wherein the performing of the symbol matching encoding operation further comprises:

smoothing edges of the extracted symbol to improve an accuracy of the matching operation.

12. The method of claim 8, wherein the calculating of the encoding rate comprises:

calculating the encoding rate using a frequency of a use of the plurality of symbols registered in the symbol dictionary; and comparing the calculated encoding rate with a predetermined threshold value to determine the encoding mode.

13. The method of claim 7, wherein the outputting of the bit-based encoded data or the collected data as the bitstream comprises:

determining whether the encoding mode is a symbol-based encoding mode or a bit-based encoding mode based on the encoding mode information;

collecting the symbol matching encoded data and the bit-based encoded data and determining the collected data to be the binary image compression data when the encoding mode is determined to be the symbol-based encoding mode; and determining the bit-based encoded data to be the binary image compression data if the encoding mode is determined to be the bit-based encoding mode.

14. The method of claim 7, wherein the binary image comprises a plurality of binary images, and an encoding mode is determined for each binary image of the plurality of binary images.

15. The method of claim 7, wherein the binary image comprises a plurality of binary images, and a first encoding mode is determined for a first portion of the plurality of binary images, and a second encoding mode is determined for at least one binary image of a second portion of the plurality of binary images.

16. The method of claim 7, wherein the at least one extracted symbol comprises a plurality of extracted symbols, the symbol matching encoding operation is performed on a portion of the plurality of extracted symbols, and the encoding mode is determined based on the a result of the symbol matching encoding operation performed on the portion of the plurality of extracted symbols.

17. A computer-readable recording medium having recorded thereon a program to implement a method of binary image compression, the method comprising:

extracting at least one symbol from a binary image and outputting the extracted symbol and a residue image;

performing a symbol matching encoding operation on the extracted symbol, determining an encoding mode based on a result of symbol matching operation, and outputting symbol matching encoded data and encoding mode information corresponding to the encoding mode;

performing a bit-based encoding operation on the binary image or the residue image based on the encoding mode information and outputting bit-based encoded data; and outputting the bit-based encoded data as a bitstream or collecting the bit-based encoded data and the symbol matching encoded data and outputting the collected data as the bitstream, according to the encoding mode information.

18. A device to compress a binary image including at least one extracted symbol and a residue image, the device comprising:

a symbol matching encoded data generating unit to generate symbol matching encoded data corresponding to the at least one extracted symbol of the binary image, and to generate encoding mode information corresponding to an encoding mode based on a comparison between the at least one extracted symbol and a plurality of registered symbols registered in a symbol dictionary;

a bit-based encoded data generating unit to generate bit-based encoded data corresponding to one of the binary image and the residue image based on the encoding mode information; and a bitstream outputting unit to output a bitstream corresponding to the bit-based encoded data or a collection of the symbol matching encoded data and the bit-based encoded data based on the encoding mode information.

19. The device of claim 18, further comprising:

a dividing unit to generate the at least one extracted symbol by extracting at least one symbol from the binary image, and to divide the binary image into the at least one extracted symbol and the residue image.

20. The device of claim 19, wherein the dividing unit generates a bitmap of the at least one extracted symbol.

21. The device of claim 19, wherein the dividing unit extracts the at least one symbol from the binary image using a pattern recognizing algorithm.

22. The device of claim 18, wherein the symbol matching encoded data generating unit comprises:

a symbol comparing unit to determine an index of the at least one extracted symbol based on a comparison between the at least one extracted symbol and the plurality of registered symbols, and to generate the encoding mode information based on the comparison; and a symbol encoding unit to generate the symbol matching encoded data using the index of the at least one extracted symbol, a bitmap of the plurality of registered symbols, and position information of the at least one extracted symbol in the binary image.

23. The device of claim 22, wherein the symbol comparing unit comprises:

an index determining unit to determine that the index of the at least one extracted symbol is an index of a registered symbol of the plurality of registered symbols when the comparison indicates that the registered symbol matches the at least one extracted symbol, and to assign a new index to the at least one extracted symbol when the comparison indicates that the plurality of registered symbols does not include the registered symbol that matches the at least one extracted symbol.

24. The device of claim 23, wherein the symbol comparing unit comprises:

an encoding mode information generating unit to calculate an encoding rate corresponding to a frequency that the plurality of registered symbols are used in the binary image based on the comparison result, to analyze a relationship between the calculated encoding rate and a predetermined threshold, and to generate the encoding mode information based on the analysis result.

25. The device of claim 24, wherein the encoding mode information generating unit generates bit-based encoding mode information when the calculated encoding rate is greater than or equal to the predetermined threshold, and generates symbol matching encoding mode information when the calculated encoding rate is less than the predetermined threshold.

26. The device of claim 18, wherein the bit-based encoded data generating unit comprises:

an image selecting unit to select the residue image when the encoding mode information is symbol-based encoding information, and to select the binary image when the encoding mode information is bit-based encoding information; and a bit-based encoding unit to generate the bit-based encoded data corresponding to the selected image.

27. The device of claim 18, wherein the bitstream corresponds to the bit-based encoded data when the encoding mode information is bit-based encoding mode information, and corresponds to the collection of the symbol matching encoded data and the bit-based encoded data when the encoding information is symbol-based encoding mode information.

28. A method of compressing a binary image including at least one extracted symbol and a residue image, the method comprising:

generating symbol matching encoded data corresponding to the at least one extracted symbol of the binary image, and encoding mode information corresponding to an encoding mode based on a comparison between the at least one extracted symbol and a plurality of registered symbols registered in a symbol dictionary;

generating bit-based encoded data corresponding to one of the binary image and the residue image based on the encoding mode information; and outputting a bitstream corresponding to the bit-based encoded data or a collection of the symbol matching encoded data and the bit-based encoded data based on the encoding mode information.

29. The method of claim 28, wherein the generating of the symbol matching encoded data and the encoded mode information comprises:

determining an index of the at least one extracted symbol based on a comparison between the at least one extracted symbol and the plurality of registered symbols;

generating the symbol matching encoded data using the index of the at least one extracted symbol, a bitmap of the plurality of registered symbols, and position information of the at least one extracted symbol in the binary image; and generating the encoding mode information based on the comparison result.

30. The method of claim 29, wherein the determining of the index comprises:

determining that the index of the at least one extracted symbol is an index of a registered symbol of the plurality of registered symbols when the comparison indicates that the registered symbol matches the at least one extracted symbol; and assigning a new index to the at least one extracted symbol when the comparison indicates that the plurality of registered symbols does not include the registered symbol that matches the at least one extracted symbol.

31. The method of claim 29 wherein the generating of the encoding mode information further comprises:

calculating an encoding rate corresponding to a frequency that the plurality of registered symbols are used in the binary image based on the comparison result;

analyzing a relationship between the calculated encoding rate and a predetermined threshold; and generating the encoding mode information based on the analysis result.

32. The method of claim 31, wherein the generating of the encoding mode information further comprises:

generating bit-based encoding mode information when the calculated encoding rate is greater than or equal to the predetermined threshold; and generating symbol matching encoding mode information when the calculated encoding rate is less than the predetermined threshold.

* * * * *